United States Patent
Sahota et al.

(10) Patent No.: US 11,697,581 B2
(45) Date of Patent: Jul. 11, 2023

(54) EFFICIENT RESOURCE PROVIDER SYSTEM

(71) Applicant: VISA INTERNATIONAL SERVICE ASSOCIATION, San Francisco, CA (US)

(72) Inventors: Jagdeep Sahota, Rodeo, CA (US); Weiyi Zhou, Foster City, CA (US); Lance Weber, Longmont, CO (US); Kiran Zaveri, Foster City, CA (US); Shiv Bhatt, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/085,895

(22) PCT Filed: Jun. 20, 2017

(86) PCT No.: PCT/US2017/038253
§ 371 (c)(1),
(2) Date: Sep. 17, 2018

(87) PCT Pub. No.: WO2017/223039
PCT Pub. Date: Dec. 28, 2017

(65) Prior Publication Data
US 2019/0106317 A1   Apr. 11, 2019

Related U.S. Application Data

(60) Provisional application No. 62/352,377, filed on Jun. 20, 2016.

(51) Int. Cl.
*B67D 7/08*   (2010.01)
*G06Q 50/30*   (2012.01)
(Continued)

(52) U.S. Cl.
CPC ............ *B67D 7/08* (2013.01); *G01G 19/086* (2013.01); *G06Q 20/28* (2013.01); *G06Q 20/40* (2013.01);
(Continued)

(58) Field of Classification Search
CPC ............ B67D 7/08; B67D 7/145; B67D 7/30
(Continued)

(56) References Cited

U.S. PATENT DOCUMENTS 4,605,081 A * 8/1986 Helmly, Jr. ............ G01G 19/02
177/1
6,116,505 A * 9/2000 Withrow ................. G07F 7/025
235/378

(Continued)

FOREIGN PATENT DOCUMENTS

CN   104361646 A   2/2015
RU   2012142072 A   4/2014

OTHER PUBLICATIONS

EP17816028.9, "Extended European Search Report", dated Jun. 4, 2019, 8 pages.

(Continued)

*Primary Examiner* — Patrick F Riegler
(74) *Attorney, Agent, or Firm* — Kilpatrick Townsend & Stockton LLP

(57) ABSTRACT

Systems and techniques for increasing the efficiency of a process of providing a resource by a resource provider are disclosed. In one example, a method detects a presence of a vehicle at a fuel dispenser, transmits an authorization request message automatically in response to detecting the presence of the vehicle, and automatically allows the fuel dispenser to dispense fuel to the vehicle.

19 Claims, 6 Drawing Sheets

(51) Int. Cl.
*G06Q 30/06* (2023.01)
*G07F 13/02* (2006.01)
*G06V 20/62* (2022.01)
*G01G 19/08* (2006.01)
*G06Q 20/28* (2012.01)
*G06Q 20/40* (2012.01)
*B67D 7/04* (2010.01)

(52) U.S. Cl.
CPC ............. *G06Q 30/06* (2013.01); *G06Q 50/30* (2013.01); *G06V 20/62* (2022.01); *G07F 13/025* (2013.01); *B67D 2007/0457* (2013.01)

(58) Field of Classification Search
USPC ...................................................... 705/44, 65
See application file for complete search history.

(56) References Cited

U.S. PATENT DOCUMENTS

| | | | | |
|---|---|---|---|---|
| 6,711,474 | B1* | 3/2004 | Treyz | G01C 21/26 701/1 |
| 6,882,900 | B1* | 4/2005 | Terranova | B67D 7/067 700/236 |
| 2003/0065630 | A1* | 4/2003 | Brown | G07F 7/08 705/413 |
| 2008/0195497 | A1* | 8/2008 | Holme | G06Q 30/06 705/17 |
| 2010/0318463 | A1* | 12/2010 | Reany | G06Q 20/04 705/44 |
| 2011/0288765 | A1 | 11/2011 | Conway | |
| 2012/0036073 | A1 | 2/2012 | Basu et al. | |
| 2012/0095920 | A1* | 4/2012 | McQuade | H04L 63/107 705/50 |
| 2012/0303531 | A1* | 11/2012 | Betancourt | G06Q 20/3278 705/44 |
| 2013/0013431 | A1* | 1/2013 | Fansler | G07F 13/025 705/18 |
| 2013/0246171 | A1* | 9/2013 | Carapelli | G06Q 20/325 705/14.51 |
| 2014/0074605 | A1* | 3/2014 | Sanchez | G06Q 20/204 705/14.64 |
| 2014/0095393 | A1* | 4/2014 | Nightengale | G06Q 20/20 705/44 |
| 2014/0129426 | A1* | 5/2014 | Lamb | G06Q 20/4016 705/39 |
| 2014/0149293 | A1* | 5/2014 | Laracey | G06Q 20/108 705/44 |
| 2014/0172157 | A1* | 6/2014 | Bellamy, III | G06Q 20/3224 700/232 |
| 2014/0172690 | A1 | 6/2014 | Duke et al. | |
| 2014/0222533 | A1* | 8/2014 | Ovick | G06Q 30/0283 705/14.23 |
| 2014/0263629 | A1 | 9/2014 | McQuade et al. | |
| 2014/0327778 | A1* | 11/2014 | McQuade | G06F 21/44 348/156 |
| 2015/0032558 | A1* | 1/2015 | Bonk | G06Q 20/202 705/21 |
| 2015/0032625 | A1 | 1/2015 | Dill et al. | |
| 2015/0242855 | A1 | 8/2015 | Vilnai | |
| 2015/0254642 | A1 | 9/2015 | Bondesen et al. | |
| 2016/0012657 | A1 | 1/2016 | Reineccius et al. | |
| 2016/0035013 | A1 | 2/2016 | Plattenburg et al. | |
| 2016/0055441 | A1 | 2/2016 | Rappoport | |
| 2016/0104155 | A1* | 4/2016 | McGaugh | G06Q 20/405 705/65 |
| 2016/0125458 | A1* | 5/2016 | Enriquez | G06Q 30/0267 705/14.27 |
| 2016/0232527 | A1* | 8/2016 | Patterson | G06Q 20/405 |
| 2017/0180012 | A1* | 6/2017 | Tingler | G06K 7/10198 |
| 2017/0221116 | A1* | 8/2017 | Makke | B67D 7/04 |
| 2017/0243410 | A1* | 8/2017 | Caballero | G07C 9/38 |
| 2018/0181952 | A1* | 6/2018 | Enriquez | G06Q 20/325 |
| 2019/0050853 | A1* | 2/2019 | Kumar | G06Q 20/3674 |

OTHER PUBLICATIONS

*International Search Report & Written Opinion*, PCT/US2017/038253, dated Aug. 28, 2017.
Application No. EP17816028.9, Office Action, dated Feb. 5, 2021, 10 pages.
Application No. CN201780038049.8, Office Action, dated Nov. 3, 2022, 20 pages.
Application No. CN201780038049.8, Office Action, dated Apr. 7, 2023, 32 pages.

* cited by examiner

EFFICIENT RESOURCE PROVIDER SYSTEM

CROSS REFERENCE TO RELATED APPLICATIONS

This application is the US national stage of PCT/US2017/038253, filed Jun. 20, 2017, which claims priority to U.S. Patent Application No. 62/352,377, filed on Jun. 20, 2016, the disclosure of which is herein incorporated by reference in its entirety for all purposes.

BACKGROUND

Conventional resource providing systems such as fuel dispensing systems require a significant number of steps to provide a given resource. For example, a person that wants to purchase gasoline from a gas station will first drive up to an open fuel dispenser. The person will then insert her payment card into the fuel dispenser, and wait for an authorization or pre-authorization of the transaction. The person will then wait, and then be prompted to select a type of fuel for her vehicle. After the prompt, the person can then select the desired type of fuel, will manipulate and insert the fuel dispenser nozzle into her vehicle. The fuel dispenser nozzle is then actuated such that fuel is dispensed into the vehicle. The fuel dispenser will automatically stop dispensing fuel if the vehicle is full of fuel. Or, if less fuel is desired by the person, the person may stop the fuel dispenser from dispensing fuel at any time by manipulating the nozzle.

In the case of a pre-authorization, a standard amount of money (e.g., seventy-five dollars) will be held against the person's payment card account such that the person is not able to spend that amount of money (i.e., the person's "limit" is reduced by that amount). After the fuel is dispensed, the hold may be released and a normal authorization request for the actual transaction amount can be submitted by the fuel dispenser or the merchant operating the fuel dispenser.

As noted above, a conventional fuel dispensing process requires a large number of steps, and this large number of steps results in a significant amount of processing time. For example, the amount of time required to dispense fuel for a typical car can be as long as 10-15 minutes. Although this amount of time may not seem significant when viewed from the perspective of re-fueling a single car, the additional time rapidly accumulates when hundreds of vehicles may be re-fueled at a gas station on a particular day. Furthermore, the gas station may lose customers if the station's fuel dispensers are constantly occupied, so from the gas station's perspective, it is much better if customers can obtain fuel for their vehicles as quickly and efficiently as possible.

Embodiments of the invention address these and other problems, individually and collectively.

SUMMARY

Described herein are a system and techniques for increasing the efficiency of a process of providing a resource by a resource provider. The resource provider may be a fuel station that provides fuel (e.g., gasoline) via one or more fuel dispensers (e.g., gas pumps). In embodiments of the invention, a user of a vehicle can simply approach a fuel dispenser in her vehicle. The user can manipulate a nozzle of the fuel dispenser to dispense fuel into the vehicle. The user does not have to interact with the fuel dispenser before manipulating the nozzle to dispense the fuel. Because the user need not physically manipulate a payment card or other payment device, the acquisition of fuel at the fuel dispenser is much faster than conventional methods of fuel delivery. It should be noted that, for the purposes of this disclosure, the term "fuel" may refer to any means for powering a vehicle. For example, in some embodiments a fuel dispenser may be a gas pump which is configured to deliver gasoline to the vehicle. In another example, the fuel dispenser may be an electric charging station configured to provide a vehicle's battery with an electrical charge.

One embodiment of the invention is directed to a method comprising: detecting a presence of a vehicle at a fuel dispenser; b) transmitting an authorization request message automatically in response to detecting the presence of the vehicle; and c) allowing the fuel dispenser to dispense fuel to the vehicle, wherein a user of the vehicle does not interact with the fuel dispenser between or during steps a) through c)

In other embodiments, the disclosure is directed to techniques for providing pre-authorization of a transaction related to a vehicle before the transaction is initiated with respect to the vehicle. In some embodiments, the system receives image information (e.g., an image of a vehicle's license plate) that is used to identify the vehicle. The system may then identify account information and corresponding payment device information to be used in the transaction. In some embodiments, the system may determine an appropriate amount to be pre-authorized for the transaction based on a type, weight, or size of the vehicle. Once the system receives a response to the pre-authorization request, a resource may be provided to the vehicle without any physical interaction between the operator and a resource dispenser. In some embodiments, the system enables an operator of the vehicle to be charged for the resource that is provided based upon the pre-authorization and without any payment action from the operator.

Another embodiment of the invention is directed to a method of receiving, by a computer such as a server computer, information relating to an image of at least a portion of a vehicle at or approaching a resource provider; determining, by the computer, an account, based on the information relating to the image; determining, by the computer, a pre-authorization amount; generating, by the computer, a pre-authorization request message comprising the pre-authorization amount with respect to the account; transmitting, by the computer, the pre-authorization request message to an authorization computer for approval; receiving, by the computer, a pre-authorization response message from the authorization computer; and providing, by the resource provider, a resource to a user of the vehicle.

Another embodiment of the invention is direct to a resource provider system comprising: one or more input sensors; a resource dispenser; a processor; and a computer readable medium coupled to the processor. The computer readable medium of the resource provider comprising code executable by the processor to cause the computer to: receive input from the one or more input sensors, the input indicating a presence of a vehicle; determine, based on the input, an identifier for the vehicle; determine, based on the identifier, an appropriate pre-authorization amount to be associated with a transaction related to the vehicle; generate an authorization request for the transaction to include the appropriate pre-authorization amount; transmit the authorization request to an authorization computer; and upon receiving a response from the authorization computer indicating that the transaction is pre-authorized, provide instructions to the resource dispenser to enable dispensation of a resource up to the appropriate pre-authorization amount.

Another embodiment of the invention is directed to a method comprising receiving, by a computer, information relating to an image of at least a portion of a vehicle at or approaching a fuel dispenser; identifying, by the computer, based on the information relating to the image, a type of resource from a plurality of types of resources; and transmitting, by the computer, a signal indicating the type of resource to the resource provider, wherein the fuel dispenser is thereafter activated to provide the type of resource to the vehicle.

Yet another embodiment of the invention is directed to a computer comprising a processor and a computer readable medium. The computer readable medium may be a non-transitory computer readable medium and may comprise code, executable by the processor, to implement a method comprising: receiving information relating to an image of at least a portion of a vehicle at or approaching a fuel dispenser; identifying based on the information relating to the image, a type of resource from a plurality of types of resources; and transmitting a signal indicating the type of resource to the resource provider, wherein the fuel dispenser is thereafter activated to provide the type of resource to the vehicle These and other embodiments of the invention are described in further detail below.

DETAILED DESCRIPTION

Figure 1:
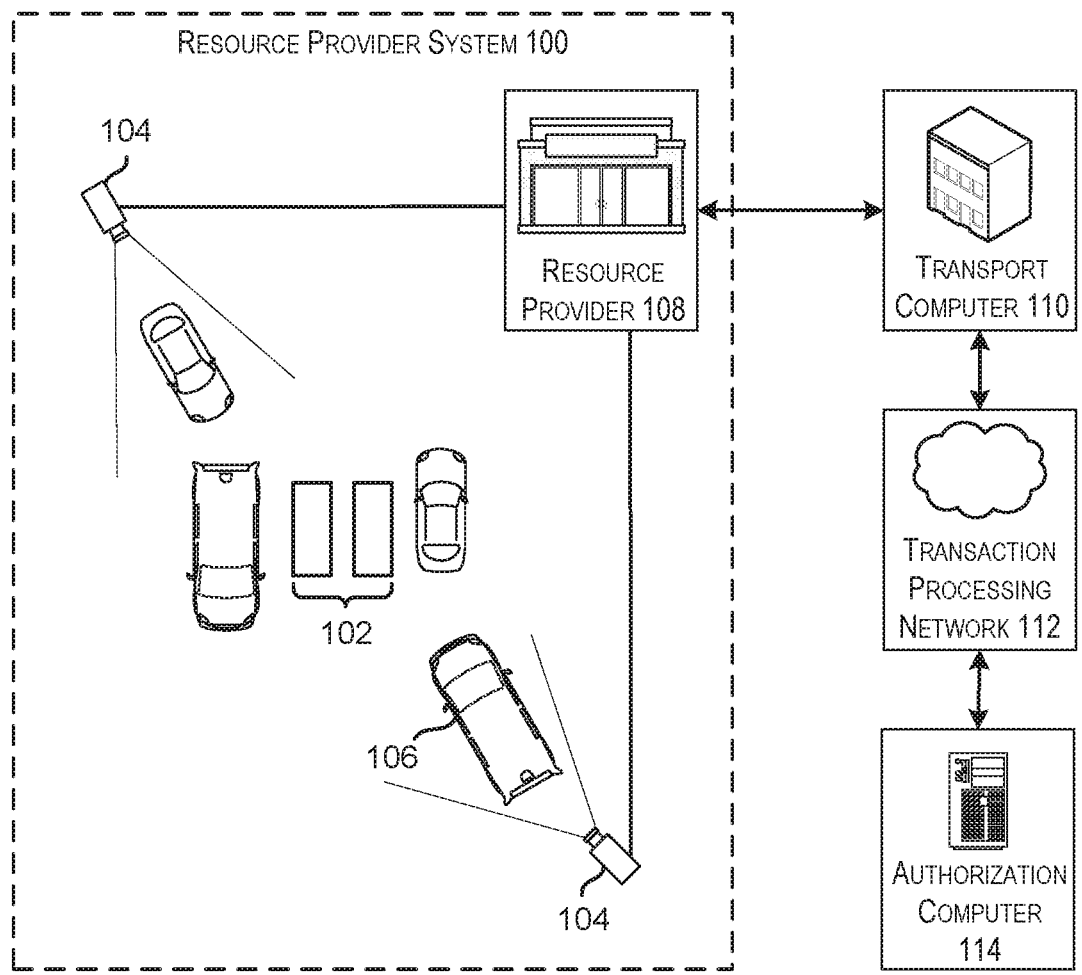
FIG. 1 depicts an illustrative example of a system that, when utilized in accordance with embodiments of the disclosure, increases the efficiency of a resource provider system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

An "authorization computer" may be any computing device operated by an entity that authorizes a request. Examples of such an entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the user.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

A "pre-authorization request message" may be a type of authorization request message. A pre-authorization request message typically seeks pre-authorization of a certain amount for a potential transaction. Receipt of the pre-authorization request message by an authorizing entity may cause the authorizing entity to "hold" the amount in the pre-authorization request message in the account of the user requesting pre-authorization. They can be used in situations where an actual amount of a transaction with a resource provider is not yet known (e.g., as in the case where gasoline is purchased). A subsequent authorization request message for the same transaction may be sent later when the amount of the actual transaction is known. The hold may be released and the transaction may be processed according to the amount in the subsequent authorization request message. The pre-authorization request message and the subsequent authorization request message may include a transaction identifier to link the two messages so that the authorizing entity computer knows that they are part of the same interaction.

An "authorization response message" may be a message that responds to an authorization request. In some cases, it may be an electronic message reply to an authorization request message generated by an authorization entity (e.g., an issuing financial institution) or a transaction processing computer. The authorization response message may include, by way of example only, one or more of the following status indicators: Approval—transaction was approved; Decline— transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "merchant" may typically be an entity that engages in transactions and can sell goods or services, or provide access to goods or services. A merchant may be an example of a resource provider.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "token" may be a substitute value for a credential. A token may be a string of numbers, letters, or any other suitable characters. Examples of tokens include payment tokens, access tokens, personal identification tokens, etc.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as a time duration as measured from the time of issuance.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement.

A "token provider" or "token service system" can include one or more computers that service payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "transaction" may be any interaction or exchange between two or more parties. For example, a transaction may include a first entity requesting resources from a second entity. In this example, the transaction is completed when the resources are either provided to the first entity or the transaction is declined.

As noted above, a number of improvements can be made to existing resource provider systems, as some existing resource provider systems require too much user interaction. One example is with respect to purchasing gasoline. For example, as noted above, when purchasing gasoline, a user of a car will have to stop at a fuel dispenser, take out a payment card, swipe the payment card, wait for authorization, select a type of fuel to dispense, wait for an instruction from the pump to begin fueling, remove the gas pump nozzle, pump the gasoline, return the nozzle, and then leave the gas pump. The time for all of these steps to occur can be between 5-20 minutes per vehicle. When a long line of vehicles is present, the delays can be significant.

Also, when purchasing gasoline at a gas station, a pre-authorization process is conducted before any gasoline has been dispensed. In the pre-authorization process, an authorization request message with a pre-defined amount, typically $75 or $100, is transmitted to an issuer. Once approved, the user of the car can pump gas up to the pre-authorized amount. $75 or $100 is then held on the account of the user so that the user is not allowed to spend that amount using that account until the hold is released. If the amount of gas that is pumped is less than the pre-authorized amount, then a subsequent authorization request message for the actual amount will be transmitted to the issuer at a later time and the hold is released.

There are a number of problems associated with the use of pre-authorization requests in this type of situation. If the vehicle is a very large vehicle such as a sports utility vehicle and the price of gas is very high, $75 or $100 may not be enough to fill the vehicle's gas tank. Conversely, if the vehicle is very small and gas efficient, and the price of gas is very low, then $75 or $100 may be too much to hold on the user's payment account. For example, too large of a hold may prevent the user or any other users of the account from conducting purchases that they otherwise would have been able to make on that account.

FIG. 1 depicts an illustrative example of a system that, when utilized in accordance with embodiments of the disclosure, increases the efficiency of a resource provider system 100. In FIG. 1, a resource provider system 100 is depicted which includes a resource dispenser and a number of input sensor devices 104. The input sensor devices 104 may be configured to capture input information related to vehicles 106 entering the resource provider system 100. The resource dispenser 102 and input sensor devices 104 may be in communication with a resource provider computer 108. The resource provider computer 108 may, in turn, be in communication with an transport computer 110 which is configured to communicate, via a transaction processing network 112, with a number of authorization computers 114.

The resource provider computer 108 may be any computing device configured to perform at least a portion of the functionality described herein. In some embodiments, the resource provider computer 108 may include a number of computing devices, each of which is configured to perform some of the functionality. In at least some embodiments of the disclosure, the resource provider computer 108 may be configured to obtain input information from the input sensor devices 104 and identify vehicles within that input information. For example, the resource provider computer 108 may be configured to obtain a vehicle identifier from the input information. In some embodiments, the resource provider computer 108 may also be configured to identify a type of vehicle (e.g., make/model) or at least a size of the vehicle from the input information. Once the resource provider computer 108 has obtained a vehicle identifier, and any other suitable information, the resource provider computer 108 may identify an account associated with that vehicle identifier and may obtain pre-authorization for a potential transaction to be conducted at the resource dispenser 102 with respect to the identified vehicle. In some embodiments, an amount of the transaction for which to obtain pre-authorization may be determined from the make, model, and/or size of the vehicle. This will be described in greater detail below.

The resource dispenser 102 may be any device (electronic or mechanical) capable of providing access to a resource. The resource dispenser 102 may be an active device (e.g., a pump that provides a resource to the vehicle) or an inactive device (e.g., a locking mechanism that prevents access to a resource). In at least one illustrative example, the resource dispenser 102 may be a fuel dispenser (i.e., a gas pump) which is used to dispense fuel to a vehicle.

The input sensor devices 104 of the resource provider system 100 may be used to obtain information related to the environment in which the resource provider system 100 is located. The input sensors may include any suitable sensor device or combination of sensor devices capable of obtaining information related to objects within an environment, including radar devices, sonar devices, ultrasound devices, infrared devices, light detection and ranging (LIDAR) devices, stereo vision camera devices, pressure plates (or other weight sensors) etc. For example, the input sensors may include depth sensors (e.g., range cameras) that are used to generate range maps of objects in proximity to the resource dispenser 102. The obtained range map may then be used to identify a type of vehicle within the area surrounding the resource provider system 100. In another example, the input sensor devices 104 may include one or more camera devices which may be used to obtain image information that depicts the environment surrounding the resource dispenser 102. Vehicle identifiers (e.g., a license plate number) may then be obtained from the image information using machine vision techniques. In some embodiments, the input sensor devices 104 may be positioned such that they are able to capture a particular angle or viewpoint. For example, camera devices may be positioned such that they are able to capture images of the rear of a vehicle that is entering an area through an ingress/egress point.

A transport computer 112 may be any computing device or plurality of computing devices configured to process transaction information received from the resource provider computer 108 and generate and/or route an authorization request message to be transmitted to the authorization computer 114. In some embodiments, the transport computer 112 may be owned and/or operated by a financial institution (e.g., an acquirer) with which the operator of the resource provider computer 108 maintains an account.

In some examples, the transaction processing network 112 may be any network of computing devices configured to route authorization requests/responses between appropriate entities. The transaction processing network 112 may include any one or a combination of many different types of networks, such as cable networks, the Internet, wireless networks, cellular networks, and other private and/or public networks. In some embodiments, the transaction processing network 112 may be an electronic payment network (e.g., VisaNet). Additionally, it should be noted that in some embodiments, the transaction processing network 112 may be embodied by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

Authorization computer 114 may be any computing device or plurality of computing devices configured to receive an authorization request message for a transaction, authorize or decline the transaction, and provide an authorization response message based on whether the transaction has been authorized or declined. The authorization computer 114 may determine whether to authorize or decline the transaction based on information associated with the transaction. In some embodiments, the authorization computer 114 may be an authorization entity affiliated with an access credential (e.g., an issuer of a credit card). The authorization computer 114 may provider pre-authorization for a potential transaction.

By way of illustrating an example interaction that utilizes the system of FIG. 1, consider a scenario in which the resource provider system 100 is a gas station which provides fuel for vehicles. In this example, a vehicle 106 may approach a gas pump (e.g., a resource dispenser 102) of the gas station. As the vehicle 106 approaches the gas pump, an image of the vehicle 106 may be captured by a camera device (e.g., an input sensor device 104). In this way, the presence of the vehicle 106 is detected by the resource provider computer 108. The resource provider computer 108 may analyze the image captured by the camera device to obtain the license plate number (e.g., a vehicle identifier) of the vehicle 106. The computing device may then identify an account associated with the vehicle based on the license plate number and may obtain pre-authorization for a transaction to be conducted. Thus, in embodiments of the invention, a pre-authorization request message (a type of an authorization request message) automatically transmitted in response to the detection of the vehicle 106. The pre-authorization may include an amount of currency for which the transaction is to be pre-authorized. That amount may be calculated based on the amount and type of fuel that is likely to be purchased, which in turn may be determined based on a type of the vehicle identified, a weight of the vehicle identified, historical transaction data, or any other suitable vehicle information. Once pre-authorization has been obtained, the user of the vehicle 106 may be allowed to dispense fuel from the resource dispenser 102. The user may manipulate a nozzle at the resource dispenser 102 and may dispense the resource (e.g., fuel) into the vehicle 106. Unlike conventional methods, in embodiments of the invention, prior to manipulating the nozzle, the user does not physically interact with the resource dispenser 102.

In some embodiments, the system may utilize two-factor authentication to authenticate a transaction. Two-factor authentication (also known as 2FA) is a method of confirming a user's claimed identity by utilizing a combination of two different components. For example, the size, shape, and/or color of the vehicle may be compared to information stored in the database in relation to the vehicle identifier in order to authenticate the transaction. In this example, the two factors used for authentication are the vehicle identifier and vehicle size, shape, and/or color of the vehicle.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol. In at least some embodiments, each component of the depicted architecture may represent one or more special purpose devices configured to perform the described functions. In some embodiments, each component of the depicted architecture may comprise a duster or group of devices that each perform the same, or a similar, function.

Figure 2:
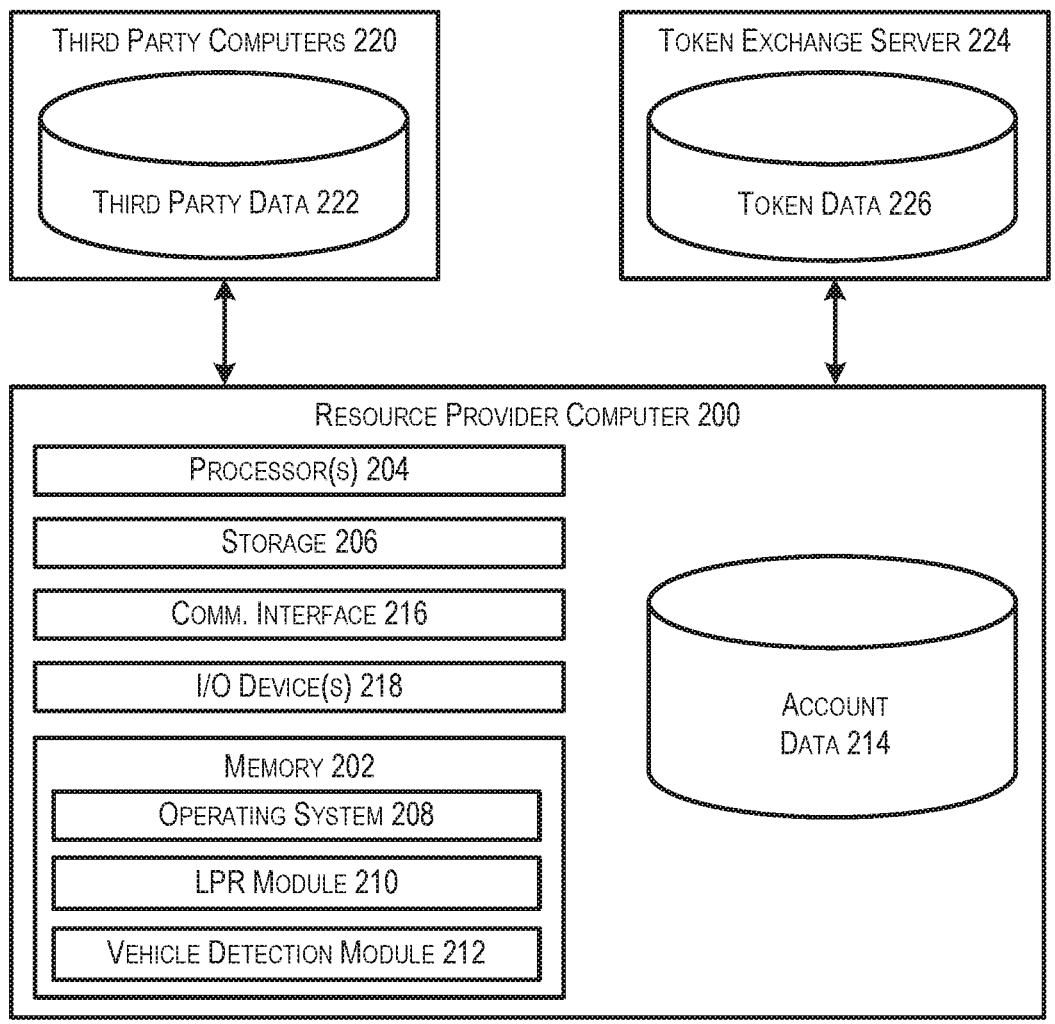
FIG. 2 depicts an illustrative system architecture that may be implemented in accordance with embodiments of the disclosure.

FIG. 2 depicts an illustrative system architecture that may be implemented in accordance with embodiments of the disclosure. In FIG. 2, a resource provider computer 200 is depicted that may implement one or more of the techniques described herein.

The resource provider computer 200 may be any type of computing device configured to communicate with and one or more of the system components. In some embodiments, the resource provider computer 200 may be executed by one more virtual machines implemented in a hosted computing environment. The hosted computing environment may include one or more rapidly provisioned and released computing resources (i.e., a cloud computing environment), which computing resources may include computing, networking, and/or storage devices.

In one illustrative configuration, the resource provider computer 200 may include at least one memory 202 and one or more processing units (or processor(s)) 204. The processor(s) 204 may be implemented as appropriate in hardware, computer-executable instructions, firmware or combinations thereof. Computer-executable instruction or firmware implementations of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of resource provider computer 200, the memory 202 may be volatile (such as random access memory (RAM)) and/or non-volatile (such as read-only memory (ROM), flash memory, etc.).

The resource provider computer 200 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM) or ROM. Turning to the contents of the memory 202 in more detail, the memory 202 may include an operating system 208 and one or more application programs or services for implementing the features disclosed herein including at least a module for reading and interpreting license plate information (LPR module 210) and/or a module for determining resource needs of a vehicle (vehicle detection module 212). The memory 202 may also include account data 214, which provides information associated with various user accounts (e.g., payment device information, etc.). In some embodiments, the account data 214 may be stored in a database.

The memory 202 and the additional storage 206, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the resource provider computer 200. The resource provider computer 200 may also contain communications connection(s) 216 that allow the resource provider computer 200 to communicate with a stored database, another computing device or server, user terminals, and/or other components of the inventory system. The resource provider computer 200 may also include input/output (I/O) device(s) and/or ports 218, such as for enabling connection with a keyboard, a mouse, a pen, a voice input device, a touch input device, a display, speakers, a printer, etc.

Turning to the contents of the memory 202 in more detail, the memory 202 may include an operating system 208, a database containing account data 214 and the one or more application programs or services for implementing the features disclosed herein, including an LPR module 210 and/or a vehicle detection module 212. In some embodiments, the LPR module 210 may be configured to, in conjunction with the processors 204, identify a vehicle identifier associated with a vehicle. In some embodiments, the LPR module 210 may receive image information from a sensor device (e.g., a camera device) and may use one or more machine vision techniques to identify a vehicle identifier (such as a vehicle license plate number). For example, the LPR module 210 may utilize an optical character recognition (OCR) technique to identify a string of characters within a detected license plate of the image information. The LPR module 210 may then provide the identified vehicle identifier to the vehicle detection module 212 for further processing. Although depicted in FIG. 2 as being included in the resource provider computer 200, it should be noted that the LPR module 210 may be included in memory of a computing device separate from the resource provider computer 200. For example, the LPR module 210 may be included in memory of an image processing server computer 310.

In some embodiments, the vehicle detection module 212 may be configured to, in conjunction with the processors 204, identify one or more needs of a consumer based on a detected vehicle identifier. To do this, in some embodiments, the vehicle detection module 212 may identify a make and model of the vehicle. In some cases, this may be done based on the vehicle identifier. For example, the vehicle identifier may be associated with vehicle information stored in account data (e.g., the vehicle may be enrolled in a program maintained by the resource provider). In some embodiments, the vehicle detection module 212 may be configured to communicate with an external entity (e.g., a third party computer) to determine information associated with the vehicle identifier. In some embodiments, the vehicle detection module 212 may be configured to identify a capacity or volume associated with the vehicle based on the determined make and model. For example, the vehicle detection module 212 may calculate a likely maximum transaction value for an anticipated transaction by multiplying a resource cost by a maximum amount of the resource associated with that vehicle. For example, a vehicle that has a fuel tank capacity of 12 gallons may be associated with a maximum transaction value of $60.00 if fuel is $5.00 per gallon ($5.00×12). In some embodiments, the vehicle detection module 212 may identify past transactions conducted by an owner of the vehicle (e.g., by matching the vehicle identifier to past transactions) and may identify a maximum transaction value from those past transactions (e.g., being the highest value transaction conducted by the owner of the vehicle in the past).

In some embodiments, the resource provider computer 200 may be in communication with a number of third party computers 220 which maintain third party data 222. Third party computers 220 may be any computing devices operated on behalf of a third party entity (e.g., an entity unaffiliated with the resource provider). The third party computers 220 may be configured to perform one or more requested services. For example, in some embodiments, the resource provider computer 200 may be in communication with third party computers 220 configured to identify information related to a vehicle. In this example, the resource provider computer 200 may provide a third party computer 220 with a vehicle identifier (e.g., a license plate number) and the third party computer 220 may identify one or more details related to the vehicle by querying the third party data 222. For example, the third party may be a state department of motor vehicles (DMV) to which the resource provider computer 200 may submit a license plate query. Upon receiving the request, the DMV may query a vehicle database for a make, model, and/or owner of a vehicle associated with the license plate information, which may subsequently be returned to the resource provider computer 200.

In some embodiments, the resource provider computer 200 may be in communication with a token exchange server 224 which maintains token data 226. Token data 226 may include a token vault. The token exchange server 224 may be any computing device configured to manage mappings between an account number and a representation of that account number. In some embodiments, the resource provider computer 200 may be provided with a token with which to make a payment. In these embodiments, upon initiation of a transaction the resource provider computer 200 may provide an authorization request message to the token exchange server 224 that includes a token. Upon receiving this authorization request message, the token exchange server 224 may then replace the token with the real account number and forward the authorization request message to an authorization entity via a processing network. When the token exchange server 224 receives an authorization response message, the token exchange server 224 may replace the real account number with the token and forward the authorization response message back to the resource provider computer 200. In this way, transmittal of the real account number over unsecured communication channels is reduced.

Figure 3:
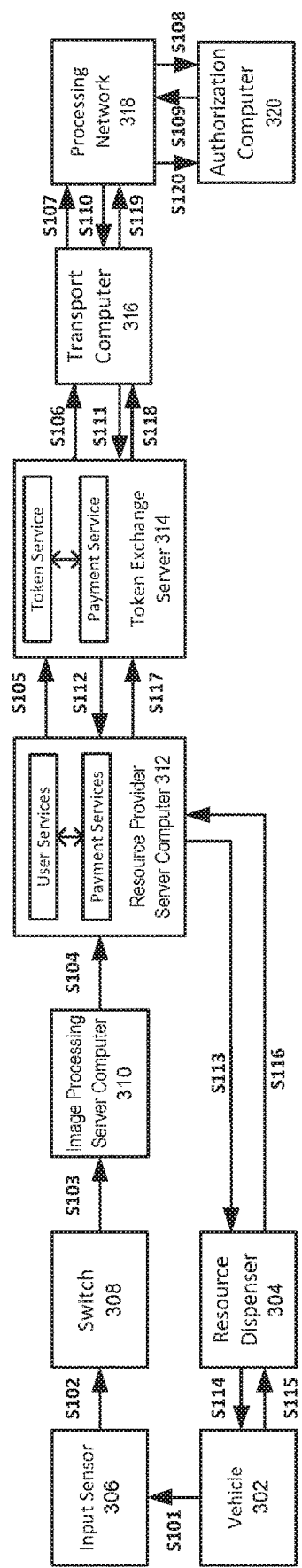
FIG. 3 shows a diagram of a system for conducting automatic vehicle-based transactions, according to an embodiment of the invention.

FIG. 3 shows a block diagram of a system according to an embodiment of the invention. FIG. 3 also shows a flow diagram, which can be used to illustrate methods according to embodiments of the invention. The system and method described with respect to FIG. 3 relates to dispensing a resource such as fuel to a vehicle. Embodiments of the invention, however, are not so limited and may apply to other resources that may be supplied to the vehicle or user. For example, the resource may relate to food that a user may consume or services (e.g., car washes, oil changes, or repair services) that may be performed on the vehicle.

In FIG. 3, a vehicle 302 may be operated by a user that wants to purchase a resource (e.g., gasoline) for the vehicle 302. The vehicle 302 may approach or be at a resource dispenser 304.

In step S101, a input sensor 306 may capture an image of at least a portion of the vehicle 302. The input sensor 306 may include a camera device and motion sensor that can detect the presence of the vehicle 302 and also capture an image that includes at least a portion of the vehicle 302. For example, the image captured may include an image of a license plate on the vehicle that includes a license plate identifier. The captured image can be converted by the input sensor 306 to image data. This image data may then be transmitted to the image processing server computer 310 via a switch 308 in steps S102 and S103. The switch 308 can switch communications between multiple detection devices associated with multiple fuel dispensers at a single gas station.

Using the image data, the image processing server computer 310 can determine information relating to the image, which may include one or more characteristics of the vehicle 302. Such characteristics may include the license plate number, make, model, year, color, other physical details (e.g., damage markings, rim size, paint patterns, etc.), the number of passengers, and any other suitable information about the vehicle 302. In one example, the information relating to the image can include a license plate number for the vehicle 302. The information relating to the image may then be transmitted to the resource provider server computer 312 in step S104.

The resource provider server computer 312 may then use the information to determine an account. The account may be any suitable account including a merchant account, and the account may include an account number and may be linked to a payment device (e.g., a PAN or payment token) as well as various information regarding the user's vehicle. For example, the user may have previously pre-registered the license plate number, make, and model of the vehicle with the resource provider server computer 312 (e.g., during an enrollment process).

The resource provider server computer 312 may also contain a database with information for instructions that might be provided, depending upon the information relating to the captured image of the vehicle (or portion thereof). In some embodiments, different pre-authorization amounts may be stored for different vehicle types. For example, the database may contain information that links higher pre-authorization amounts to vehicles with larger fuel tanks and/or lower gas efficiency, and lower pre-authorization amounts to vehicles with smaller fuel tanks and/or higher gas efficiency. For example, a small sedan such as a Prius™ may be linked to a pre-authorization amount of $50, whereas a large sport utility vehicle (SUV) such as an Escalade™ may be linked to a pre-authorization amount of $150. In other embodiments, each account may be linked to specific pre-authorization amounts based upon the type of vehicle associated with the account, user preferences, vehicle size, vehicle capacity, historical user purchase information at that merchant, or any other suitable factor.

In other embodiments, each account and/or vehicle may be linked to information specifying a specific resource type to be provided for that particular account and/or vehicle. If the resource provider is a gasoline pump and the resource is gasoline, then the type of gasoline to be dispensed may be associated with a specific account and/or vehicle. The type of gasoline may also be based upon a user preference instead of or in addition to the recommended gasoline for the particular vehicle. For example, an account for one user may be linked to information specifying that the user's vehicle requires only regular unleaded gasoline with an octane rating of 87. However, historical transaction data for that user may indicate that the user prefers to use unleaded gasoline with an octane rating of 89. In this example, the resource provider may estimate a pre-authorization amount based on the unleaded gasoline with an octane rating of 89. Another account for a user may indicate that the user is driving a luxury vehicle which will use premium gasoline with an octane rating of 91. In some embodiments, such information may be automatically added to the database, or may be provided by the user during a prior registration process. In some embodiments, the information may be provided by a third party entity that maintains vehicle information. For example, information indicating that premium gasoline with an octane rating of 91 should be used for a particular vehicle may be provided by a manufacturer of that vehicle.

The resource provider server computer 312 may generate a pre-authorization request message for a determined pre-authorization amount. In some embodiments, the pre-authorization amount may be a standard amount for all types of vehicles. In some embodiments, the pre-authorization amount may be calculated according to the type of vehicle, size of vehicle, and/or user preferences or history as described above.

In step S105, the resource provider server computer 312 may send the pre-authorization request message along with a payment token (a payment token may be a substitute for a real payment account number) that may have been stored with the account to a token exchange server 314. The token exchange server 314 may then exchange the payment token for a primary account number (PAN) and may modify the authorization request message. At step S106, the token exchange server 314 may send the pre-authorization request message including the real account number and the pre-authorization amount to an transport computer 316. In step S107, the transport computer 316 may send the pre-authorization request message to a processing network 318. In step S108, the processing network 318 may forward the pre-authorization request message to an authorization computer 320 that issued the real account number. The authorization computer 320 may then check to see if the account associated with the real account number and the user are authorized to make a purchase for the pre-authorization amount. The authorization computer 320 may perform risk analyses as well as check the credit or balance of the account that is being used to conduct the transaction.

In step S109, the authorization computer 320 can send a pre-authorization response message back to the processing network 318. In step S110, the processing network 318 can forward the pre-authorization response message to the transport computer 316. In step S111, the transport computer 316 can send the pre-authorization response message to the token exchange server 314. The token exchange server 314 may then substitute a token for the real account number in the pre-authorization response message. In step S112, The token exchange server 314 can then send the pre-authorization response message along with a token to the resource provider server computer 312. It should be noted that although a token exchange server 314 is depicted with respect to FIG. 3, some embodiments of the disclosure may not use a token exchange server 314. For example, the resource provider may generate an authorization request message to include a user's PAN.

Upon receiving the pre-authorization response message, the resource provider server computer 312 may cause the resource dispenser 304 to activate so that it can dispense the resource (e.g., fuel). For example, in step S113, the resource provider server computer 312 may transmit a communication signal to the resource dispenser 304 which activates the resource dispenser 304 to dispense fuel to the vehicle 302. In step S114, the user may then insert a fuel nozzle in the resource dispenser 304 into an inlet to the gas tank of the vehicle 302 and can manipulate the nozzle so that fuel is dispensed from the resource dispenser 304 to the vehicle 302. In step S115, the resource dispenser 304 may receive feedback that the user has finished filling vehicle 302 with fuel. This feedback may be communicated manually by the user or automatically through a mechanical sensor in the resource dispenser 304.

In step S116, the resource dispenser 304, may send a signal back to the resource provider server computer 312 indicating that the fuel dispensing process has been terminated. The resource provider server computer 312 may then determine a final transaction amount for the fuel that was actually dispensed. At some time after the fuel was delivered to the vehicle 302, the resource provider server computer 312 may generate a subsequent authorization request message comprising the payment token and the final transaction amount. The subsequent authorization request message may contain a transaction identifier or the like, or flag, so that the authorization computer knows to release any pre-authorized amounts held on the users account. In step S117, the resource provider server computer 312 may then transmit the authorization request message to the token exchange server 314. The token exchange server 314 may exchange the token for the real account number, and in step S118, may forward the authorization request message with the real account number and the final transaction amount to the transport computer 316. In step S119, the transport computer 316 may forward the authorization request message to the processing network 318. In step S120, the processing network 318 may send the authorization request message to the authorization computer 320. The authorization computer 320 may then authorize the transaction amount, and then may also release the hold on the previously authorized pre-authorization amount. After the authorization request message is approved, an authorization response message may be transmitted back to the merchant server computer.

At the end of the day or at any other suitable period of time after the authorization response message is received by the resource provider server computer 312, a clearing and settlement process is performed between the transport computer 316, processing network 318, and the authorization computer 320. In some embodiments, this may involve the transmission of a second authorization request to obtain authorization for an amount associated with the resource actually provided.

In the above-described process, the user of the vehicle 302 does not need to interact with the resource dispenser 304 or any device (such as a mobile phone) before the resource dispenser 304 is activated to supply fuel. That is, the user of the vehicle 302 may simply drive up to the fuel dispenser, get out of his or her vehicle 302, and manipulate the nozzle in the resource dispenser 304 to dispense fuel into the vehicle without pulling out any credit or debit card, and optionally without selecting any type of fuel. By utilizing the above-described process and system, the number of steps in the fuel dispensing process can be reduced relative to conventional systems, thereby saving significant amounts of time for the user.

Figure 4:
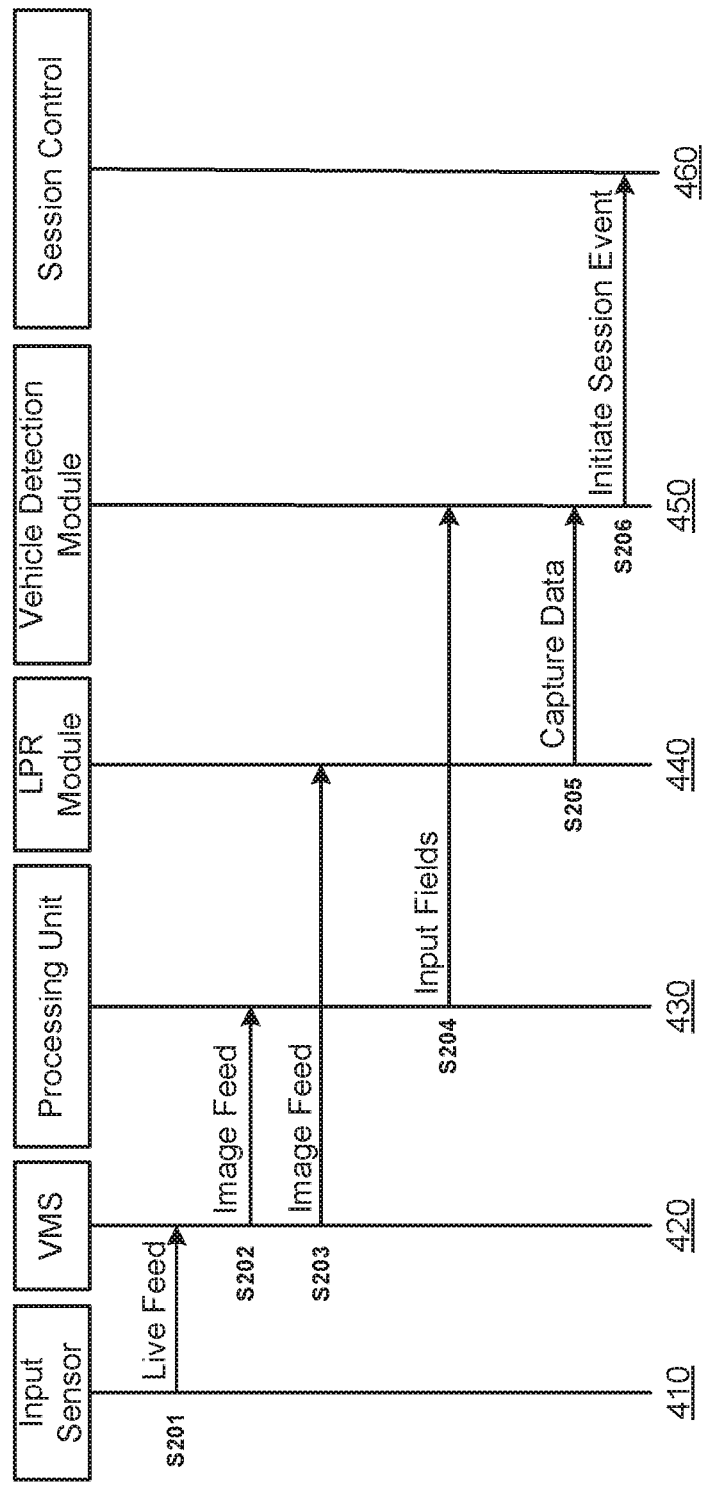
FIG. 4 shows a diagram of a system for capturing and processing an image for the purpose of conducting automatic vehicle-based transactions, according to an embodiment of the invention.

FIG. 4 shows a diagram of a system and method for capturing and processing an image for the purpose of conducting automatic vehicle-based transactions, according to an embodiment of the invention. The system involves a input sensor 410, which may be the input sensor 306 of FIG. 3 according to one embodiment of the invention. In some embodiments, the input sensor may be a camera device. The system also involves the image processing server computer 310 of FIG. 3 comprising a Video Management System (VMS) 420, a video processing unit 430, a license plate reading (LPR) module 440, and vehicle detection module 450 as shown by FIG. 4. The system also involves a session control 460, which may be a method that the resource provider server computer 312 of FIG. 3 uses to initiate a session between a user and the merchant in a transaction according to an embodiment of the invention.

In step S201, the input sensor 410 may be providing a live video feed. In step S202, the VMS 420 may continuously read the live video feed and create JPEG images and may send the images to the video processing unit 430. In step S203, the VMS 420 sends the JPEG images to the LPR Module 440. In step S204, the video processing unit 430 may process the image and perform such actions as blob detection, color recognition, and object tracking and send the results as input fields to the vehicle detection module 450 so that it can be confirmed that a vehicle is present. In step S205, the LPR Module 440 may process the JPEG images for capture data comprising information relating to the image such as a license plate number, confidence, and pump number and may send the capture data to the vehicle detection module 450. Upon receiving input fields from the video processing unit 430 as well as capture data from the LPR module 440, the vehicle detection module 450 may proceed to step S206. In step S206, a session is initiated with the merchant server computer 440 of FIG. 3 wherein the merchant can, for example, begin to look up a user account associated with the information relating to the image received from the image processing server 310 of FIG. 3.

In some embodiments, the input sensor 306 of FIG. 3 may be a system including other components in addition to the input sensor 410 of FIG. 4 to assist in confirming the presence of a vehicle. For example, the input sensor 306 may include a sensor such as a load cell (or other suitable weight sensor) near or at the fuel dispenser which may sense the force being exerted by the weight of the vehicle. In another embodiment, the input sensor 306 may utilize Bluetooth Low Energy (BLE) to detect when a vehicle is nearby. For example, a Bluetooth device in the vehicle may connect to a Bluetooth receiver upon coming into proximity of the Bluetooth receiver. In this example, information about the vehicle may be transmitted over the connection.

In some embodiments, the initiation of a session for a given user account may invoke the generation of an alert message that is sent to the user. The alert message may be sent to a device associated with the user such as a mobile device. In some embodiments, the alert message may be sent to the user after a transaction occurs and may include the transaction amount.

Figure 5:
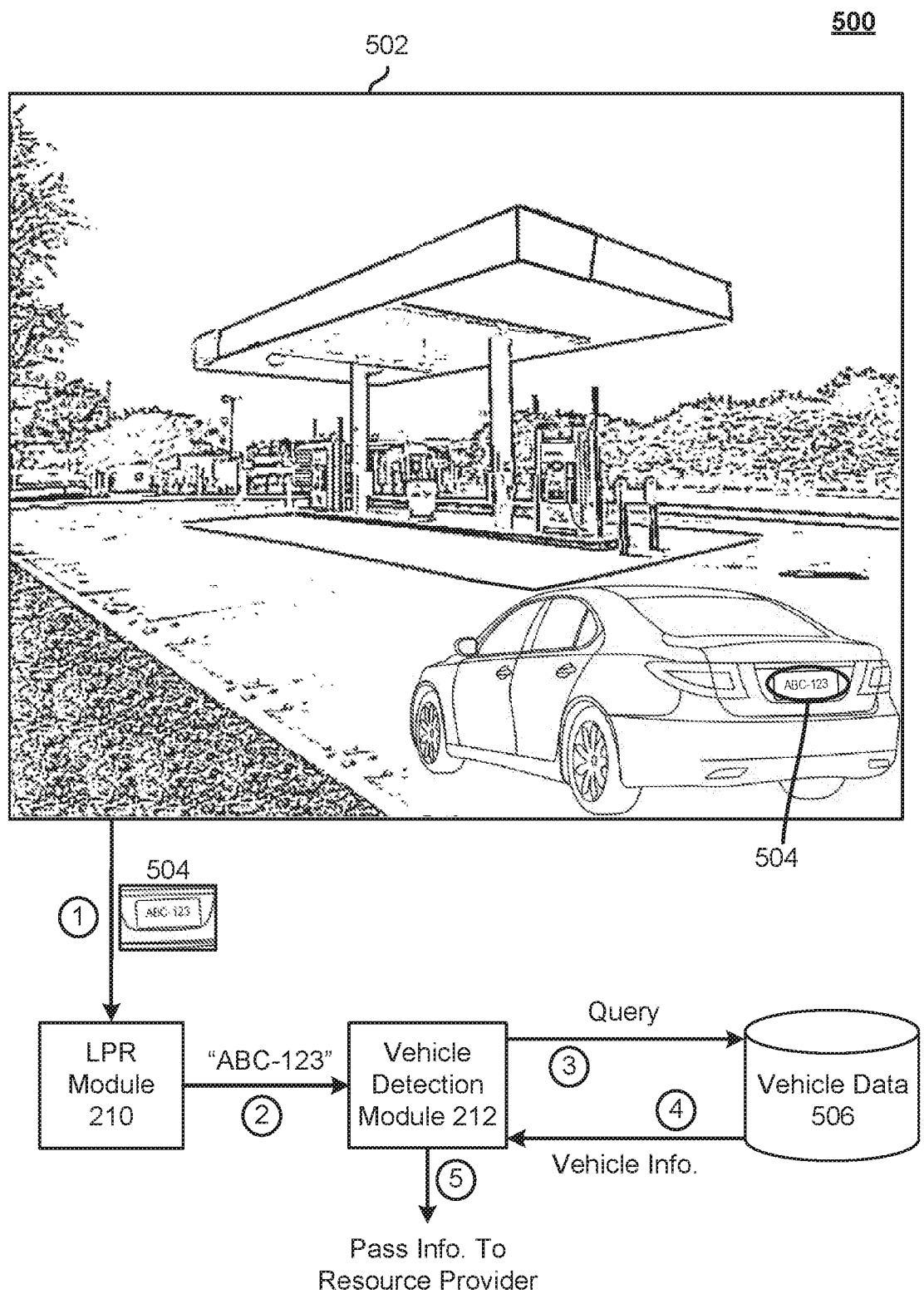
FIG. 5 depicts an example of a process for identifying vehicle attributes that may be implemented by a resource provider system in which at least one embodiment of the disclosure is implemented.

FIG. 5 depicts an example of a process for identifying vehicle attributes that may be implemented by a resource provider system in which at least one embodiment of the disclosure is implemented. In particular, FIG. 5 is directed to an implementation of embodiments of the disclosure within a gas station.

Process 500 may begin when an image 502 is captured by a camera device in communication with the resource provider system. In some embodiments, the resource provider system may have a number of camera devices, at least some of which are positioned to capture images of vehicles entering a service area of the resource provider system. In some embodiments, the cameras may be positioned to capture images of the rear of a vehicle in order to capture license plate information. In some embodiments, the camera devices may constantly stream image information to the resource provider system and the process 500 may begin when a vehicle is detected entering the service area (e.g., via a pressure plate or motion sensor).

At step 1 of process 500, a portion of an image that includes a license plate 504 is identified within the image 502. In some embodiments, this may utilize machine vision techniques to identify a license plate on a vehicle (e.g., via pattern recognition). The portion of the image is then provided to the license plate reading (LPR) module 210.

LPR module 210 may be an example LPR module 212 of FIG. 2. Upon receiving a portion of the image that includes the license plate (or an indication of the position of the license plate within the image 502), the LPR module 212 may utilize character recognition techniques to translate the image of the license plate into a string of text that includes a license plate number (e.g., a vehicle identifier). For example, in FIG. 5, the image of the license plate 504 is translated into the string of text "ABC-123."

At step 2 of process 500, the license plate number may be passed to the vehicle detection module 212. In some embodiments, the vehicle detection module 212 may be instantiated through the use of a method call, with the license plate number being passed as an input parameter in that method call. It should be noted that some embodiments of the disclosure may not include a vehicle detection module 212. For example, an amount of a potential transaction may be determined from a weight of the vehicle and the vehicle identifier may be provider to a token exchange server to obtain pre-authorization.

At step 3 of process 500, the vehicle detection module 212 may query a database of vehicle data 506 for a number of vehicle attributes. In some embodiments, the database of vehicle data 506 may be maintained by the resource provider. For example, in some embodiments vehicles may be enrolled in an account maintained by the resource provider. In these embodiments, the resource provider may query account information for vehicle information that was provided during an enrollment process. In some embodiments, the database of vehicle data 506 may be maintained by a third party entity. For example, the vehicle detection module 212 may be configured to cause the resource provider computer to communicate with a state department of motor vehicles (DMV) or other regulatory agency. In some embodiments, the vehicle detection module 212 may be configured to cause the resource provider computer to identify vehicle information based on input data received from input sensors. For example, the vehicle detection module 212 may be configured to obtain a range map (e.g., a depth map) from a depth sensor that includes the vehicle. Based on this range map, the vehicle detection module 212 may determine a size and shape of the vehicle. The size and shape of the vehicle may then be compared to vehicle size and shape data stored in the database of vehicle data 506 in order to identify one or more attributes of the vehicle. In some embodiments, machine vision techniques may be used along with machine learning (e.g., Neural Networks or Deep Learning) to identify the type of vehicle within the image 502.

At step 4 of process 500, information related to the vehicle may be returned to the vehicle detection module 212 in response to the query. The returned vehicle information may include a vehicle make, model, fuel capacity (e.g., fuel tank volume), fuel quality, frequency of refueling (e.g., based on historical transaction data), or any other suitable factor. The vehicle information may then be used by the resource provider to increase the efficiency of an authorization process at step 5. For example, the resource provider may estimate an appropriate pre-authorization amount based on the vehicle information. The resource provider may then obtain pre-authorization from an account associated with the vehicle for the pre-authorization amount.

Figure 6:
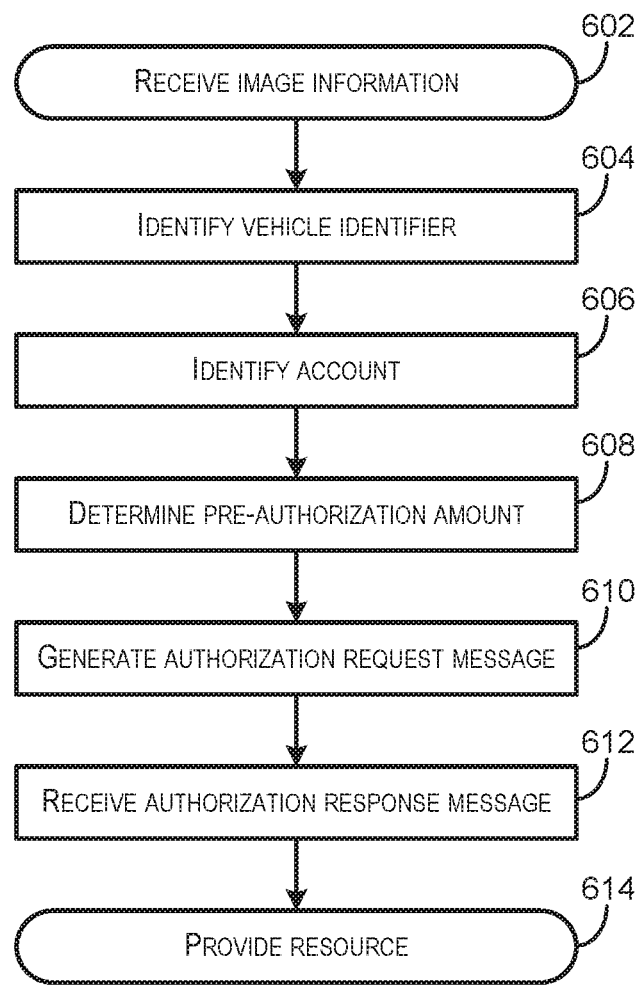
FIG. 6 depicts a flow diagram illustrating an example process for obtaining pre-authorization for a potential transaction based on vehicle detection in accordance with at least some embodiments.

FIG. 6 depicts a flow diagram illustrating an example process for obtaining pre-authorization for a potential transaction based on vehicle detection in accordance with at least some embodiments. Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least some embodiments, the process 600 depicted in FIG. 5 may be implemented by the resource provider computer 200 depicted in FIG. 2. The code may be stored on a computer-readable storage medium, for example, in the form of a computer program including a plurality of instructions executable by one or more processors. The computer-readable storage medium may be non-transitory.

Process 600 may begin at 602, when input sensor information is received at the resource provider computer. In some embodiments, the input sensor information may include information obtained from a number of different types of input sensor devices. For example, the resource provider computer may receive an image of at least a portion of a vehicle that includes an image of the vehicle's license plate information from a camera input sensor as well as an indication of the vehicle's weight from a pressure plate input sensor. In another example, the resource provider may receive a range map that includes an indication of the shape and size of a vehicle from a depth sensor (e.g., a range camera). In some embodiments, the input sensors may be positioned to obtain input information related to vehicles that are entering a service area.

At 604, the resource provider computer may identify a vehicle identifier from the received image information. In some embodiments, this may involve the use of an optical character recognition process (e.g., matrix matching or feature extraction) to convert characters within the image into text. In some embodiments, a vehicle identifier may be obtained via a communication connection established with the vehicle. For example, a wireless device (e.g., Bluetooth, WLAN, etc.) may connect to a wireless receiver of the resource provider as the vehicle comes into proximity of the wireless receiver. In this example, an communication connection may be established between the wireless device of the vehicle and the wireless receiver of the resource provider and information related to the vehicle may be transmitted to the resource provider over that communication connection. In some embodiments, the vehicle may include an on-board vehicle system which manages authentication of an operator of the vehicle. Some examples of such an on-board system are described in U.S. patent application Ser. No. 15/074,908 to Kim et. al., entitled "Multi-level Authentication for Onboard Systems," which is hereby incorporated by reference in its entirety. An on-board vehicle system installed in a vehicle may be configured to discover, and establish communication with, electronic devices within proximity of the vehicle. In embodiments of the disclosure that are compatible with an on-board vehicle system, the resource provider system may establish a communication channel with the on-board vehicle system and may receive the vehicle identifier via that communication channel.

In some embodiments, an on-board vehicle system may also be in communication with a remote server or servers via a wireless connection. In these embodiments, the resource provider system may receive an indication that a vehicle has entered a service area through the use of a location detection technique (e.g., geofencing). For example, the on-board vehicle system may report its location to a remote server on a continuing basis. The remote server may detect, based on this location information, that the vehicle has entered within the vicinity of the resource provider system. Upon making this determination, the remote server may contact the resource provider system to indicate that the vehicle is present in the service area.

At 606, the resource provider computer may identify an account associated with the vehicle identifier. In some embodiments, the resource provider may query a database for pre-registered account information. For example, in order to participate in some embodiments of the disclosure, a user may first be required to register his or her vehicle with the resource provider during an enrollment process. During this process, the user may provide a number of details, such as license plate numbers, payment devices (e.g., account numbers or tokens), a mobile device identifier (e.g., a phone number), one or more user preferences, and/or any other suitable details. In some embodiments, the vehicle identifier may be mapped to an account based on historical transaction data. For example, the first time that a vehicle is identified by the resource provider, an operator of the vehicle may be required to present a payment device manually. On subsequent visits to the resource provider, the vehicle may be matched to the presented payment device automatically. In some embodiments, an account maintained by the resource provider may include a vehicle identifier and a payment token. In these embodiments, the resource provider may retrieve the payment token upon detecting the vehicle identifier.

At 608, the resource provider computer may determine an appropriate pre-authorization amount for which pre-authorization should be obtained with respect to a potential transaction. In some embodiments, the pre-authorization amount may be a predetermined value. For example, all potential transactions may be pre-authorized at a pre-authorization amount of $50.00. In some embodiments, the pre-authorization amount may be calculated based on attributes of the vehicle.

In one example, the resource provider may calculate a pre-authorization amount based on the type of the vehicle. In this example, the resource provider may obtain information related to a resource capacity (e.g., a fuel tank volume) of the vehicle and a resource grade (e.g., a fuel quality) from a database of vehicle information by querying on the vehicle type. The resource provider may then calculate a pre-authorization amount from these values. By way of illustration, in the case that the resource is fuel, a resource provider may determine that a particular type of vehicle has a 13 gallon fuel tank and requires regular unleaded gasoline which is selling for $3.50 per gallon. In this example, the resource provider may obtain pre-authorization for a pre-authorization amount of $45.50 (13×$3.50).

In another example, the resource provider may calculate a pre-authorization amount from the size, weight, and/or shape of the vehicle. In some embodiments, the resource provider may utilize a number of tiers of pre-authorization amounts based on thresholds. For example, if the vehicle weighs more than, or has a volume greater than, a first threshold amount, then the resource provider may obtain pre-authorization for a pre-authorization amount of $150. In this example, if the vehicle weighs less than, or has a volume less than, the first threshold amount, but weighs more than, or has a volume greater than, a second threshold amount then the resource provider may obtain pre-authorization for a pre-authorization amount of $100. If the vehicle weighs less than, or has a volume less than, the second threshold amount, then the resource provider may obtain pre-authorization for a pre-authorization amount of $50.

In some embodiments, the pre-authorization amount may be determined based on historical transaction data and/or user preference data. For example, during an enrollment process, the user may select a maximum transaction amount to be associated with his or her vehicle. In this example, the pre-authorization amount may be set to the maximum transaction amount. In another example, the pre-authorization amount may be set to some predetermined amount (e.g., $5.00) greater than the largest amount in a historical transaction identified with respect to the vehicle. In some embodiments, this amount may be adjusted based on price fluctuations for the resource.

At 610, the resource provider computer may generate an authorization request message. The authorization request may include at least a payment device and the pre-authorization amount. In some cases, the payment device may be a PAN and the authorization request message may be transmitted to an authorization computer for processing. In some cases, the payment device may be a payment token (e.g., an ApplePay or AndroidPay token) and the authorization request message may be transmitted to a token exchange server associated with the payment token, which may then re-generate the authorization request to include account information and forward the request to an authorization computer. It should be noted that a payment device may also include verification information that may be used to verify the authenticity of a payment device. For example, the payment device may include a cryptogram that may be used to verify a payment token. In some embodiments, the resource provider computer may provider the authorization request message to an authorization entity via a transaction processing network. In some embodiments, the authorization request message may be routed through, or generated by, a transport computer (e.g., an acquirer). In these embodiments, the resource provider computer may receive a response message through the transport computer.

Upon receiving an authorization response message to the authorization request message at 612, the resource provider computer may determine whether the potential transaction has been authorized. In the event that the potential transaction is not authorized, an operator of the vehicle may be asked to provide a different payment device than one on record. In the event that the potential transaction is authorized, the resource provider computer may provide an operator of the vehicle with access to the resource for which the transaction is to be conducted at 614. In some embodiments, the operator of the vehicle may be provided with access to up to an amount of the resource that is valued at an amount for which pre-authorization was obtained. For example, if the resource is fuel and if the vehicle is pre-authorized to obtain up to $50.00 worth of fuel, then the operator of the vehicle may be given the ability to withdraw up to $50.00 worth of fuel, but not more. In some embodiments, the operator of the vehicle may be provided the opportunity to simply leave after the transaction is completed. For example, the operator may be billed automatically for the resource dispensed without any further interaction on behalf of the operator. In this example, pre-authorization may be obtained for a potential transaction as the operator approaches the resource dispenser. The resource may then be dispensed based on the pre-authorization and the operator is free to exit the area without providing any additional payment details. In this example, a settlement and clearance process may be performed for the actual amount of resource dispensed to the operator.

The process 600 may also result in a notification being provided to an account holder associated with the vehicle. For example, in some embodiments the resource provider may provide a notification to a user's mobile device (e.g., via a phone number stored in association with the account) prior to obtaining pre-authorization. In these embodiments, the account holder may be given the ability to stop the pre-authorization process by responding to the notification. In another example, the resource provider may provide a notification to a user's mobile device indicating a total amount for which the transaction has been completed based on the resource obtained.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, Python, or C# using, for example, conventional or object-oriented techniques. The software code may be stored as a series of instructions, or commands on a computer-readable medium, such as a random access memory (RAM), a read-only memory (ROM), a magnetic-based medium, a solid-state medium, or an optical medium. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   a) detecting, by a computer comprising a processor and a memory, a presence of a vehicle at a fuel dispenser by receiving information relating to an image of at least a portion of the vehicle at or approaching a resource provider by optically recognizing vehicle identification information from the vehicle;
   b) determining, by the computer, a user account based on the information relating to the image;
   c) determining, by the computer, a payment token associated with the user account;
   d) determining, by the computer, a pre-authorization amount for a financial transaction by:
      identifying a vehicle type of the vehicle based on the image;
      querying a database of vehicle information based on the vehicle type in order to obtain a resource capacity for the vehicle and to obtain a resource grade for the vehicle, wherein the database of vehicle information is a database that is separate from the user account; and
      calculating the pre-authorization amount based on a price for the resource grade for the vehicle and the resource capacity of the vehicle;
   e) transmitting a pre-authorization request message to an issuer bank computer, the pre-authorization request message including at least the pre-authorization amount and the payment token, wherein a real account number is substituted for the payment token by a token exchange server;
   f) upon receiving a pre-authorization response message from the issuer bank computer, authorizing the fuel dispenser to dispense fuel to the vehicle up to the determined pre-authorization amount, the pre-authorization response message including at least the payment token that is substituted for the real account number by the token exchange server; and
   g) after dispensing of the fuel to the vehicle is completed, generating a second authorization request message including the payment token and a transaction amount notifying the issuer bank computer to release the pre-authorization amount held on the user account,
   wherein a user of the vehicle does not interact with the fuel dispenser between or during steps a) through f).

2. The method of claim 1 wherein the method further comprises:
   transmitting, by the computer to the fuel dispenser, a communication signal which activates the fuel dispenser to dispense the fuel to the vehicle.

3. The method of claim 1 wherein determining the pre-authorization amount based upon the information relating to the image comprises determining the pre-authorization amount based upon a type of the vehicle or a size of the vehicle.

4. The method of claim 1 wherein the information relating to the image of at least the portion of the vehicle was obtained using a camera device, and wherein the image of at least the portion of the vehicle comprises at least an image that includes a license plate of the vehicle.

5. The method of claim 1 further comprising:
   wherein the pre-authorization request message that is transmitted to the issuer bank computer comprises the payment token.

6. A resource provider system comprising:
   one or more input sensors;
   a resource dispenser;
   a processor; and
   a computer readable medium coupled to the processor, the computer readable medium comprising code executable by the processor to cause the resource provider system to perform a method comprising:
   a) detecting a presence of a vehicle at a fuel dispenser by receiving information relating to an image of at least a portion of the vehicle at or approaching a resource provider by optically recognizing vehicle identification information from the vehicle;
   b) determining a user account based on the information relating to the image;
   c) determining a payment token associated with the user account;
   d) determining a pre-authorization amount for a financial transaction by:
   identifying a vehicle type of the vehicle based on the image;
   querying a database of vehicle information based on the vehicle type in order to obtain a resource capacity for the vehicle and to obtain a resource grade for the vehicle, wherein the database of vehicle information is a database that is separate from the user account; and calculating the pre-authorization amount based on a price for the resource grade for the vehicle and the resource capacity of the vehicle;

e) transmitting a pre-authorization request message to an issuer bank computer, the pre-authorization request message including at least the pre-authorization amount and the payment token, wherein a real account number is substituted for the payment token by a token exchange server;

f) upon receiving a pre-authorization response message from the issuer bank computer, authorizing the fuel dispenser to dispense fuel to the vehicle up to the determined pre-authorization amount, the pre-authorization response message including at least the payment token that is substituted for the real account number by the token exchange server; and g) after dispensing of the fuel to the vehicle is completed, generating a second authorization request message including the payment token and a transaction amount notifying the issuer bank computer to release the pre-authorization amount held on the user account, wherein a user of the vehicle does not interact with the fuel dispenser between or during steps a) through f).

7. The resource provider system of claim 6, wherein the one or more input sensors includes at least a camera device, wherein an input includes an image of the vehicle, and wherein an identifier for the vehicle is determined by using optical character recognition to convert an image of a license plate within the image of the vehicle into text.

8. The resource provider system of claim 7, wherein the camera device is positioned such that the image of the vehicle includes a back end of the vehicle.

9. The resource provider system of claim 6, wherein the one or more input sensors includes at least a weight sensor, and the pre-authorization amount is determined based on a weight of the vehicle.

10. The resource provider system of claim 9, wherein the pre-authorization amount is determined based on the weight of the vehicle exceeding a threshold value.

11. The resource provider system of claim 6, wherein the pre-authorization amount is determined based on vehicle information received from a third party computer.

12. The resource provider system of claim 6, wherein the one or more input sensors includes at least a depth sensor, and the pre-authorization amount is determined based on a size of the vehicle.

13. The resource provider system of claim 6, wherein the pre-authorization amount is a predetermined value.

14. The resource provider system of claim 6, wherein the one or more input sensors includes at least a wireless receiver, and wherein an identifier for the vehicle is determined based upon the identifier for the vehicle being transmitted to the wireless receiver by a wireless transmitter within the vehicle.

15. The resource provider system of claim 14, wherein the identifier for the vehicle is transmitted to the wireless receiver by the wireless transmitter within the vehicle automatically upon the vehicle coming into proximity of the wireless receiver.

16. A method comprising:

receiving, by a computer comprising a processor and a memory, information relating to an image of at least a portion of a vehicle at or approaching a fuel dispenser, wherein the image is detected by optical recognition;

identifying, by the computer, based on the information relating to the image, a type of resource from a plurality of types of resources; and transmitting, by the computer, a signal indicating the type of resource to a resource provider;

determining a pre-authorization amount pre-authorized by an issuer bank computer for a financial transaction, wherein the determining the pre-authorization amount comprises:

identifying a vehicle type of the vehicle based on the image;

querying a database of vehicle information based on the vehicle type in order to obtain a resource capacity for the vehicle and to obtain a resource grade for the vehicle, wherein the database of vehicle information is a database that is separate from a user account; and calculating the pre-authorization amount based on a price for the resource grade for the vehicle and the resource capacity of the vehicle, transmitting a pre-authorization request message to the issuer bank computer, the pre-authorization request message including at least the pre-authorization amount and a payment token, a real account number is substituted for the payment token by a token exchange server, wherein the fuel dispenser is activated to provide the type of resource to the vehicle up to the determined pre-authorization amount after receiving a pre-authorization response message, the pre-authorization response message including at least the payment token that is substituted for the real account number by the token exchange server; and generating a second authorization request message including the payment token and a transaction amount notifying the issuer bank computer to release the pre-authorization amount held on the user account.

17. The method of claim 16 wherein a resource is fuel and the type of resource is a grade of fuel.

18. The method according to claim 1, wherein the resource capacity of the vehicle used to calculate the pre-authorization amount is partially based on whether the vehicle is a high gas efficiency vehicle or low gas efficiency vehicle.

19. The method according to claim 1, wherein the token exchange server is configured to manage mappings between the real account number and a representation of the real account number.

* * * * *